(12) United States Patent
Hallsten

(10) Patent No.: US 7,713,732 B1
(45) Date of Patent: May 11, 2010

(54) HIGH STRENGTH MODULAR SUPPORT FOR BIOFILTRATION AND COMPOSTING

(75) Inventor: Jeffrey A. Hallsten, Sacramento, CA (US)

(73) Assignee: Hallsten Corporation, Sacramento, CA (US)

( * ) Notice: Subject to any disclaimer, the term of this patent is extended or adjusted under 35 U.S.C. 154(b) by 1524 days.

(21) Appl. No.: 10/942,350

(22) Filed: Sep. 15, 2004

(51) Int. Cl.
C12M 1/14 (2006.01)
C12M 3/04 (2006.01)

(52) U.S. Cl. .............. 435/299.1; 435/290.1; 435/294.1

(58) Field of Classification Search .............. 435/299.1, 435/297.2, 294.1, 290.1; 55/494, 358; 34/237; 52/126.1
See application file for complete search history.

(56) References Cited

U.S. PATENT DOCUMENTS

| | | | | |
|---|---|---|---|---|
| 4,125,533 A | * | 11/1978 | Murayama et al. | 546/19 |
| 4,279,109 A | * | 7/1981 | Madl, Jr. | 52/263 |
| 4,793,223 A | * | 12/1988 | Horne et al. | 81/176.15 |
| 4,905,437 A | * | 3/1990 | Heather | 52/263 |
| 4,909,690 A | * | 3/1990 | Gapp et al. | 411/411 |
| 5,072,557 A | * | 12/1991 | Naka et al. | 52/126.6 |
| 5,333,425 A | * | 8/1994 | Nickerson et al. | 52/222 |
| 5,412,914 A | * | 5/1995 | Daw et al. | 52/126.6 |
| 5,454,195 A | | 10/1995 | Hallsten | |
| 6,241,033 B1 | * | 6/2001 | Hoffman | 175/320 |
| 6,255,102 B1 | | 7/2001 | Hallsten | |
| 2002/0157339 A1 | * | 10/2002 | Repasky | 52/506.06 |
| 2003/0089049 A1 | * | 5/2003 | Scissom et al. | 52/126.1 |
| 2005/0005547 A1 | * | 1/2005 | Mead | 52/263 |

* cited by examiner

*Primary Examiner*—Walter D Griffin
*Assistant Examiner*—Shanta G Doe
(74) *Attorney, Agent, or Firm*—Thomas M. Freiburger

(57) ABSTRACT

A modular support system for organic filter material, compost material or other material is formed of a multiplicity of polygonal bed platform modules with planar top surfaces, the modules arranged side by side contiguously to form a bed platform which is elevated above a base surface. Perforations are included in at least some of the bed platform modules to allow passage of air, gas or liquid through the elevated support bed platform. The bottom sides of the modules have sockets to receive legs, and special legs are provided at corners where a plurality of adjacent modules meet, to engage with sockets in the undersurface in all of the adjacent nodules. At corners the modules are preferably bolted down to the corner pedestals or legs. The modular support system can support very heavy loads, such as earth-moving equipment used to move and spread filter bed or compost material.

13 Claims, 17 Drawing Sheets

HIGH STRENGTH MODULAR SUPPORT FOR BIOFILTRATION AND COMPOSTING

BACKGROUND OF THE INVENTION

The invention concerns removal of noxious odors and components from gases given off by a sewage treatment facility. More specifically, the invention concerns a modular support system for erecting a biofiltration support bed in virtually any size and shape desired. The support can also be used for a compost bed.

Biological air pollution control has been used on an increasing basis in recent years to cleanse noxious and odorous gases, such as those emanating from a sewage treatment plant. The biological filtration systems, or biofilters utilize a bed of stacked biofilter material such as compost, tree bark, peat, heather or soil, generally about three feet or more deep. The containment gas from the sewage treatment plant or other sources is blown through the biofilter material in an upward direction. The material in the biofiltration bed provides an environment for a diverse culture of microorganisms, which degrade the gaseous pollutants as they pass through the biofilter.

Such biofiltration or biological treatment of the gases is an inexpensive treatment method, but the raw gas stream must generally meet certain conditions: The pollutants should be water soluble and biodegradable, and free of toxic components. Also, there must be sufficient concentration of oxygen. Further, the gas stream should be nearly saturated with water (relative humidity at least about 95%), and at temperature between about 40° F. and 140° F. (more preferably between 50° F. and 100° F.). The odorous gas must also contain no more than small amounts of dust and grease.

These requirements usually dictate that the raw gas be preconditioned before entering into the biofilter bed. Preconditioning includes humidification, temperature control and removal of particulates.

In the biofilter itself, a biofilm covers the substrate of tree bark, peat, heather, etc. Water soluble air pollutants are absorbed into the biofilm and decomposed into carbon dioxide and water by the microbes. The filter beds are often built on a single level, but where area is limited, multiple level biofilters have been constructed, with the raw gas stream divided and fed in parallel to the various levels of the biofilter system.

Regarding sizing of the biofilter beds, the height of the filter bed, i.e. the stack of organic material as the medium, is generally in the range of about 1½ feet to 5 feet. Areas are up to tens of thousands of square feet. One rule of thumb regarding the calculation of needed area for a given waste air flow is that the "area load" or ratio between the waste gas flow rate and the filter area should be in the range of about 2.5 to 3.0 CFM/SF. The flow distribution and humidity of the inlet gas have to be carefully controlled, otherwise the filter bed will eventually clog and cease to function. Distribution throughout the area of the filter bed should be relatively even.

In addition to sewage treatment plants, biofilters are useful for treating the effluent gases from many other processes. These include factory farming, rendering plants, coffee roasters, foundries, composting plants, kraft paper drying and paint shops. The odorous emissions treatable include ammonia, hydrogen sulfide, amines, aldehydes, mercaptains, alcohols, disulfides, esters, fatty acids, unsaturated hydrocarbons, ketones, hexane, dichloromethane, formaldehyde, phenol, organic acids, acetone, toluene and others.

These biofilter systems are being used increasingly in treating the gases from sewage treatment processes and also some of the other processes listed above. There is a need for a relatively simple, inexpensive and modular approach for constructing a filter bed support for such biofilters.

Large compost beds can also benefit from such a modular approach, to build an elevated, air-permeable floor to support the compost bed and to support airflow to the compost material, the air being delivered through the material under pressure or suction, if desired. Such a modular support bed can be used for other purposes wherein a load-supporting, porous floor is needed, such as slaughterhouses for cattle or pigs. An elevated, porous, load-supporting, non-corrosive and non-reactive support bed is useful for a number of industrial processes.

Hallsten U.S. Pat. No. 5,454,195 discloses a modular containment system for preventing hazardous materials from leaching into the ground or otherwise escaping a defined containment area. That system includes peripheral modules and a liner to define the containment area, the modules being fillable by water or granular material, and the system has some relevance to the present invention described below. Hallsten U.S. Pat. No. 6,255,102 describes a biofiltration support/compost support structure which is modular and similar in many respects to the current invention, although differing in regard to structure that enables the system of the invention to support a heavier load.

SUMMARY OF THE INVENTION

The invention is a support system similar in modular aspects to that of U.S. Pat. No. 6,255,102, but with important structural differences that provide for a very high loading capacity. The disclosure of U.S. Pat. No. 6,255,102 is incorporated herein by reference.

The modular plastic components of the present invention, preferably compression molded of low density polyethylene, withstand the high loading which is required when heavy earth-moving equipment is driven onto the support platform to spread the biofiltration material or compost material, or to remove the material. This equipment causes extremely heavy loads on the support platform, particularly at corners, and with the system described in U.S. Pat. No. 6,255,102, corners could separate under heavy loads.

The present invention solves the above problem through the provision of molded modular support platform components, preferably compression molded, which may be of low density polyethylene, with specially constructed corners where four of the preferably square platforms meet. Pursuant to the invention, these platform components are bolted together at their corners, to a high compression strength, specially designed corner leg or pedestal that supports all four modules at the corners. In a preferred embodiment all components are made from recycled plastic materials, optimally reinforced with fibers.

Accordingly, it is among the objectives of the invention to improve the strength integrity of a modular support system for biofiltration or compost materials, in an efficient manner that provides for ease of installation. These and other objectives, advantages and features of the invention will be apparent from the following description of preferred embodiments considered along with the drawings.

DESCRIPTION OF PREFERRED EMBODIMENTS

Figure 1:
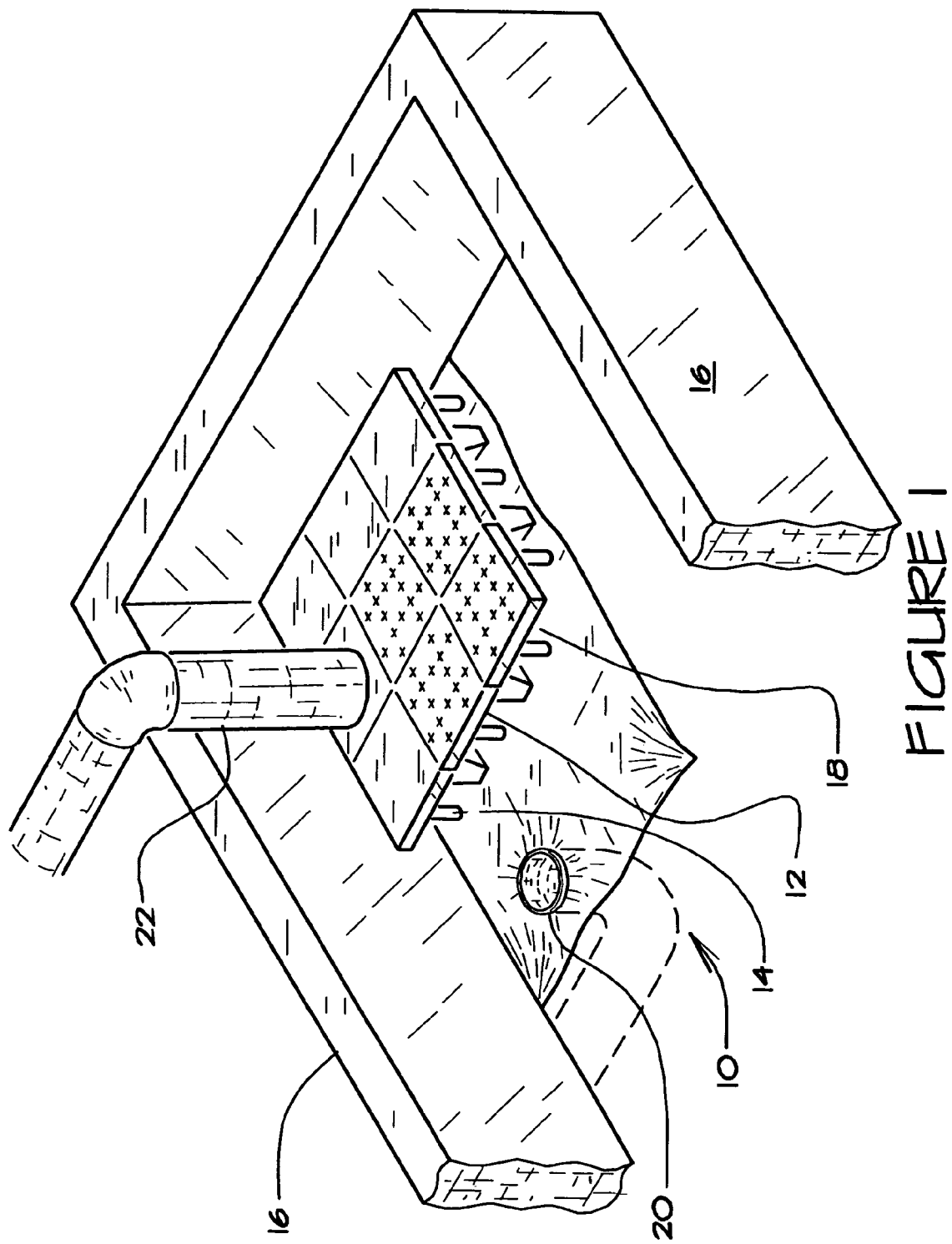
FIG. 1 is a perspective view showing generally the system of the invention as erected at a site.

FIG. 1 shows a portion of a modular support bed assembly for a biofiltration system used to filter and treat noxious or odorous gases, or for supporting a bed of composting material. The modular system includes bed platform modules 12, which may be square or rectangular (or another shape which will assemble into a contiguous platform), supported by legs 14 and assembled side-by-side in a manner similar to floor tiles, as shown. As in U.S. Pat. No. 6,255,102, these bed platform modules 12 can be assembled in an area where a wall 16 already exists, or they can form a free-standing assembly, with appropriate means for closing the plenum of space 18 at edges, such as the edge platform modules 102 shown in the '102 patent, which form a ramp. One or more sides of the completed assembly can be closed by another means, including soil or rubble piled up to form edge berms that can be in the form of ramps.

As the drawing shows, gases can be pumped into the plenum 18 under the assembly of bed platform modules 12 either from below, as indicated at the inlet 20, or from above, as indicated at the inlet tube 22; either one or the other is used. In the case of a biofiltration medium supported on the platform modules, the inlet gases are noxious, odorous gases such as from a sewage treatment facility. In the case of a compost bed, the inlet gas is air, assuring adequate air to the composting material.

As explained above, moderately heavy equipment is often used to deposit, spread, or remove medium from the assembled platform. This equipment can be a moderately small earth-moving implement such as a Bobcat or even considerably heavier equipment, up to 70,000 pounds gross vehicle weight. Under such loading, which might be in excess of 45,000 pounds per square foot, or about 17,500 pounds per platform module, the corners of the bed platform modules tend to separate in the system of U.S. Pat. No. 6,255,102. The invention solves this problem and differs from the '102 patent in providing for securement of the four contiguous corners of four adjacent platform modules in the assembly to each other and down against a special corner stand or leg which engages with the four contiguous corners of the four platforms.

Figure 2:
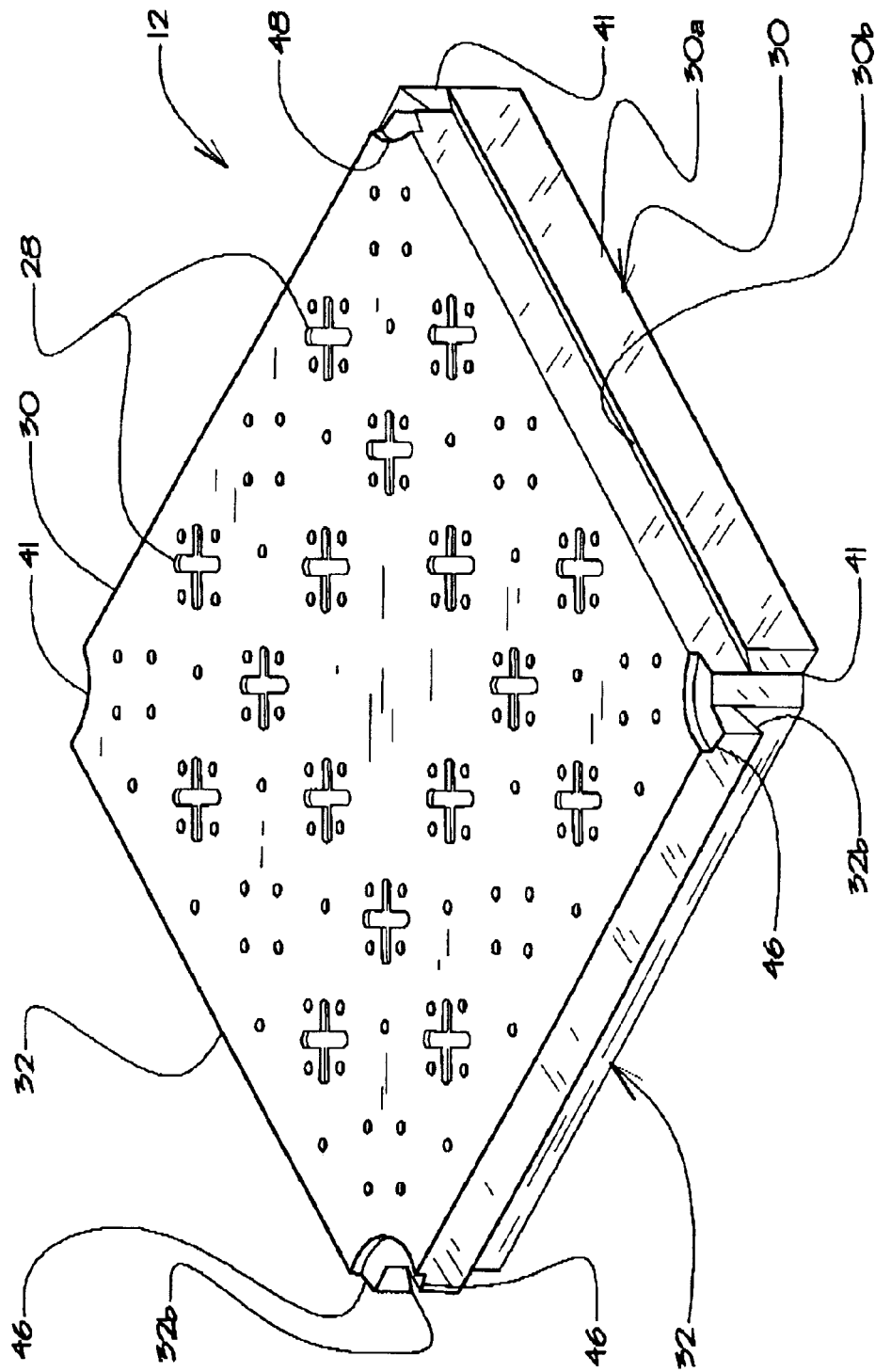
FIG. 2 is a perspective view showing a platform module of the system.
Figure 5:
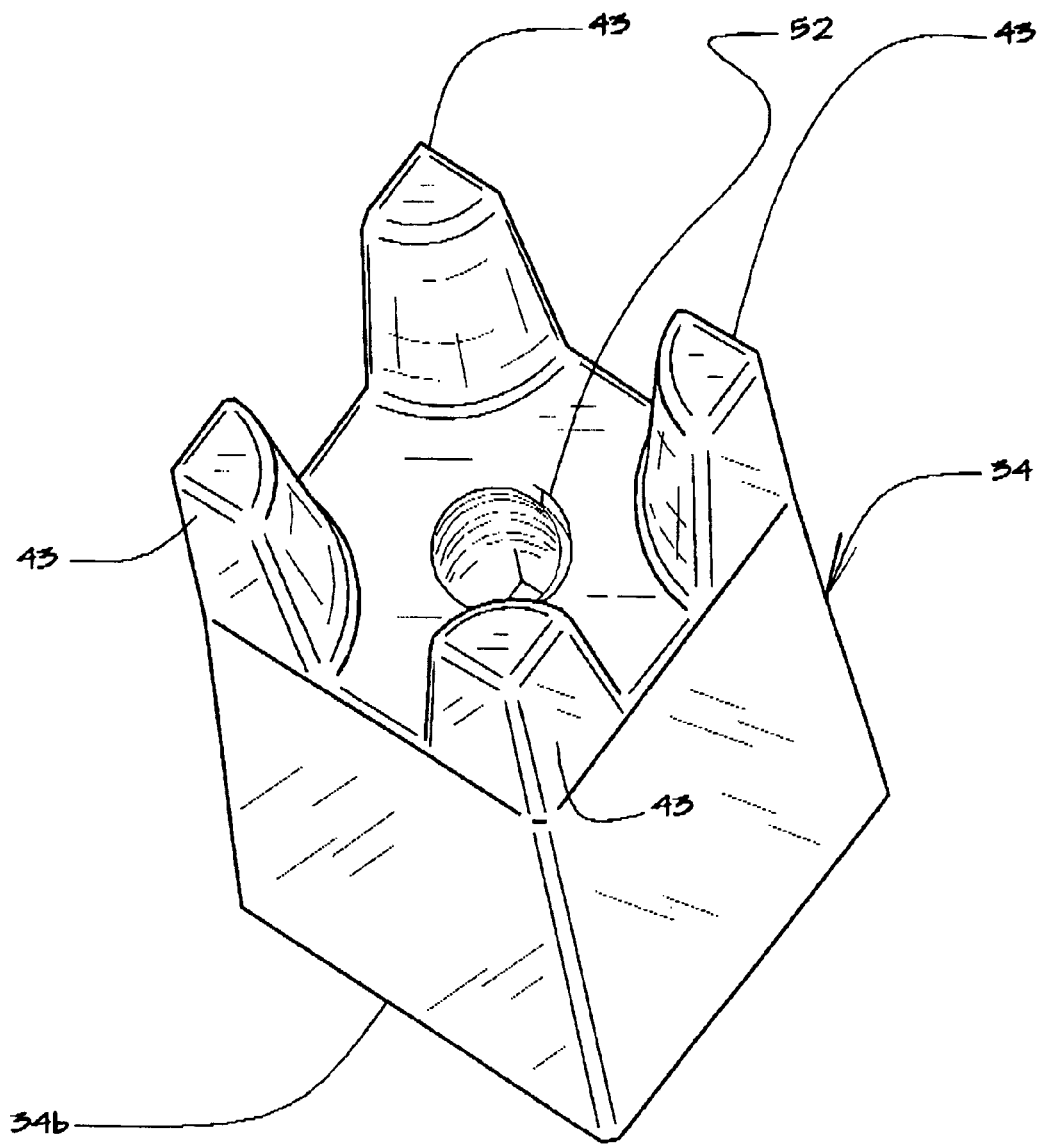
FIG. 5 is a perspective view showing a corner stand or leg of the system, for engaging with four platform modules at a corner intersection.
Figure 6:
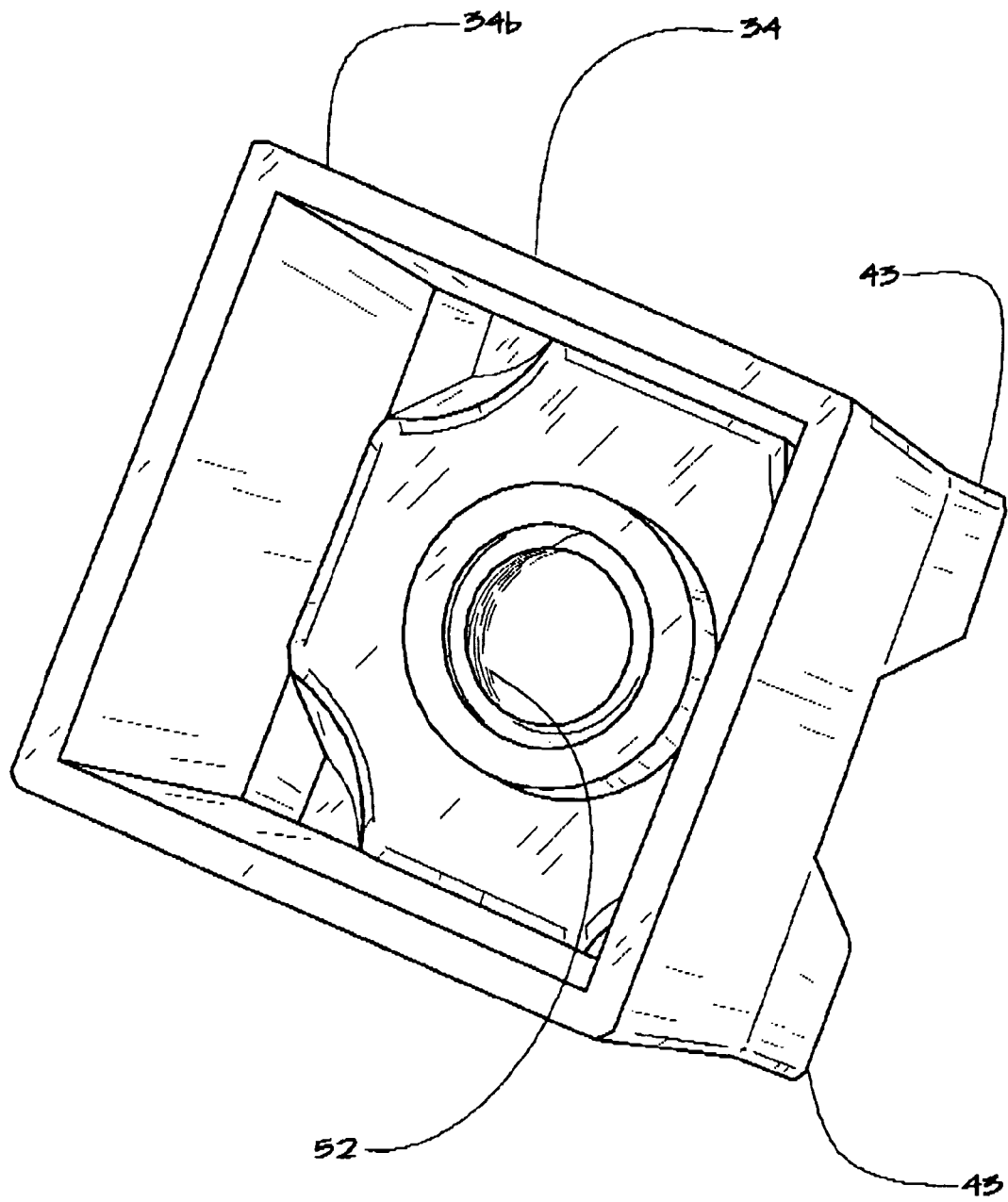
FIG. 6 is a bottom perspective view of the corner stand or leg of FIG. 3.

FIGS. 2-8 show the structure of the new bed platform modules 12 and the manner in which they are connected to a corner stand or leg. In FIG. 2 the bed platform module 12 is shown from the top side 26, showing a plurality of air openings 28 through which air or gases pass in use of the assembled system. The edges 30 and 32 are formed in a similar manner to those of U.S. Pat. No. 6,255,102, with two of the edges 30 having a bottom protruding lip 30*a* with an upwardly inclined surface 30*b*, and the other two edges 32 having a top lip 32*a* with a downwardly inclined surface 32*b* as shown in FIG. 2. This provides for inter-engagement of adjacent modules 12, by their edges, upon assembly. In the '102 patent the bed platform modules were supported on legs that extended into generally cylindrical sockets in the bottom surface of the bed platform modules, and this support and the edge locking feature were the means for maintaining the integrity of the assembly. In the present invention the corners are secured down to special corner stands or legs 34 such as shown in FIG. 5. The preferred means of securement is by bolting, with an example of a plastic bolt shown at 36 in FIG. 7.

Figure 3:
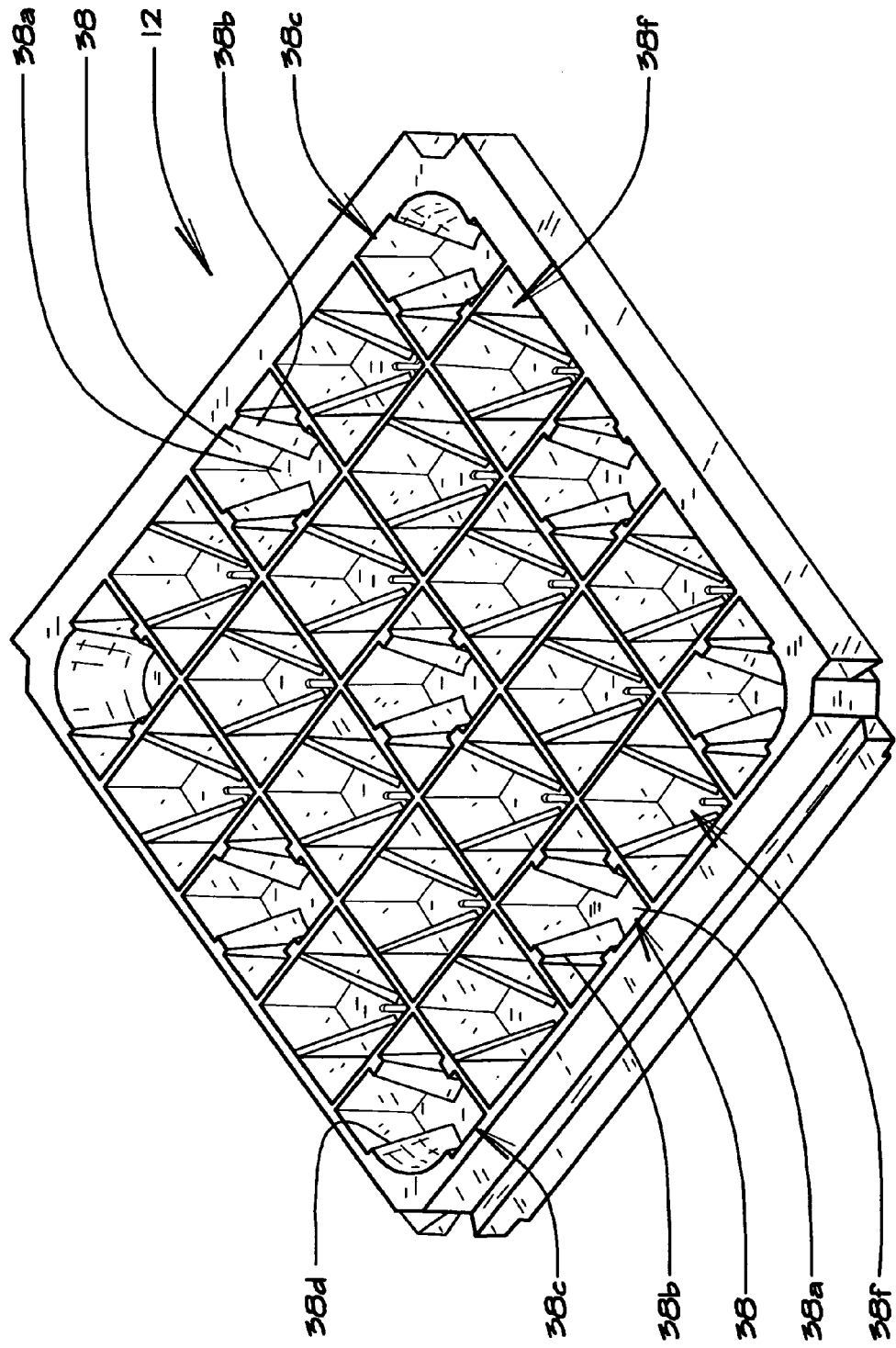
FIG. 3 is a bottom perspective view of a platform module.

The present system uses legs, but the legs are somewhat modified from those used in the '102 patent. As shown in the bottom perspective view of FIG. 3, the bed platform module 12 has a series of tapered openings 38 to receive legs 40 shown in FIG. 4. The legs 40 are shown as slightly tapered to accommodate compression molding, with a more sharply tapered top end 42, but the legs can be in other shapes if desired. The tapered top ends are preferred, since they closely locate the leg in the socket against concave partial-cone surfaces 38*b*, thereby ensuring a tight engagement with each leg and also providing distributed loading resulting in uniform strain on the material of the platform module 12. At corners of the platform module as shown in FIG. 3, the leg sockets 38*c* are somewhat different, although they are still shaped to receive the same tapered top ends 42 of the legs. This is to accommodate the corner leg 34 virtually all the area of the underside 38*a* in the recess. This provides for a very high load-supporting capacity. If the modules 12 are about two feet square, the spacing between areas of support for the module is less than 12 inches, and the load, being on a pneumatic rubber tire, is spread over an area of the module or modules such that the platform can withstand very high total weight.

Figure 3A:
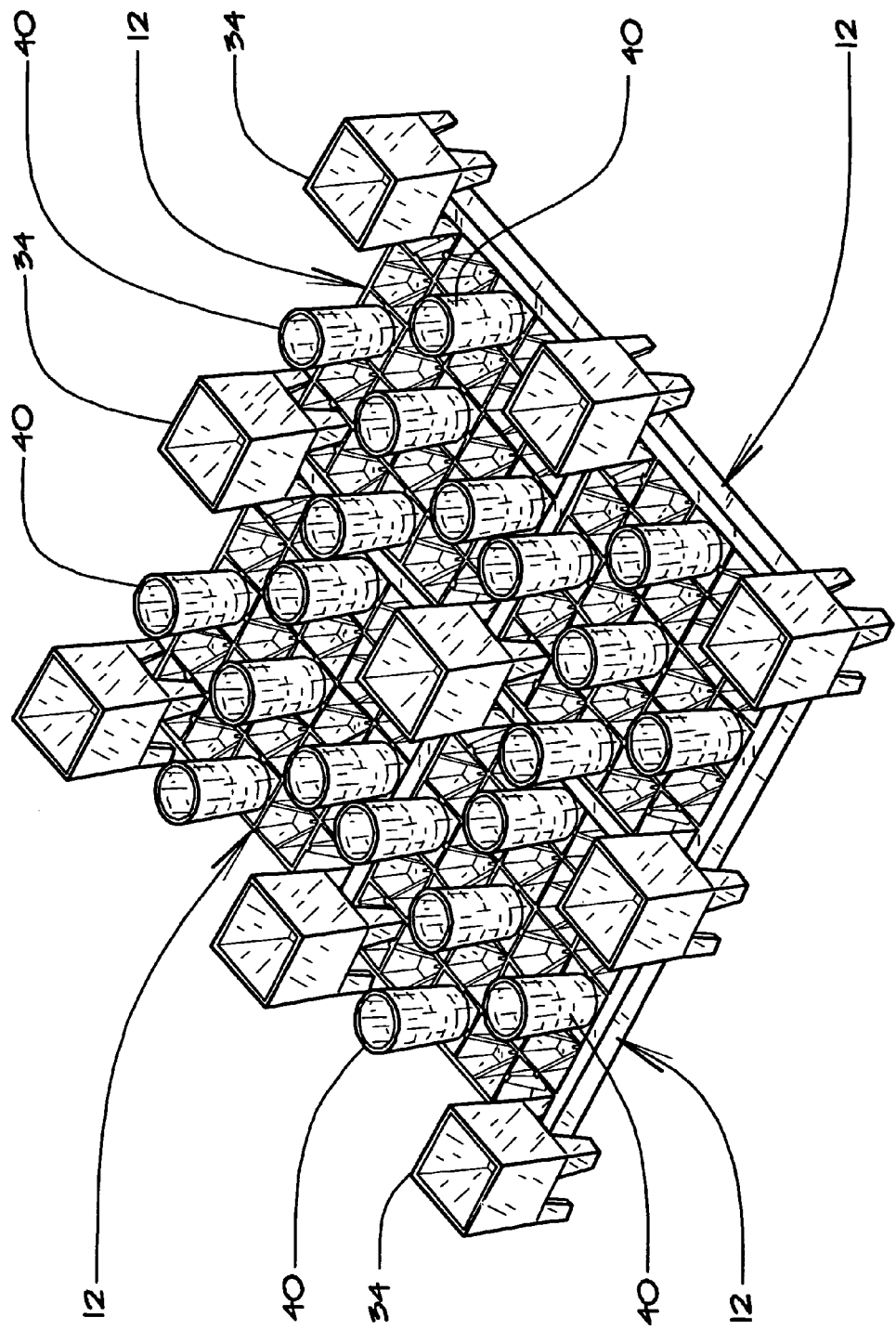
FIG. 3A is a perspective view showing the bottoms of several attached platform modules as in FIG. 2, in a preferred embodiment, and indicating support structure and its engagement with the platform module.
Figure 4:
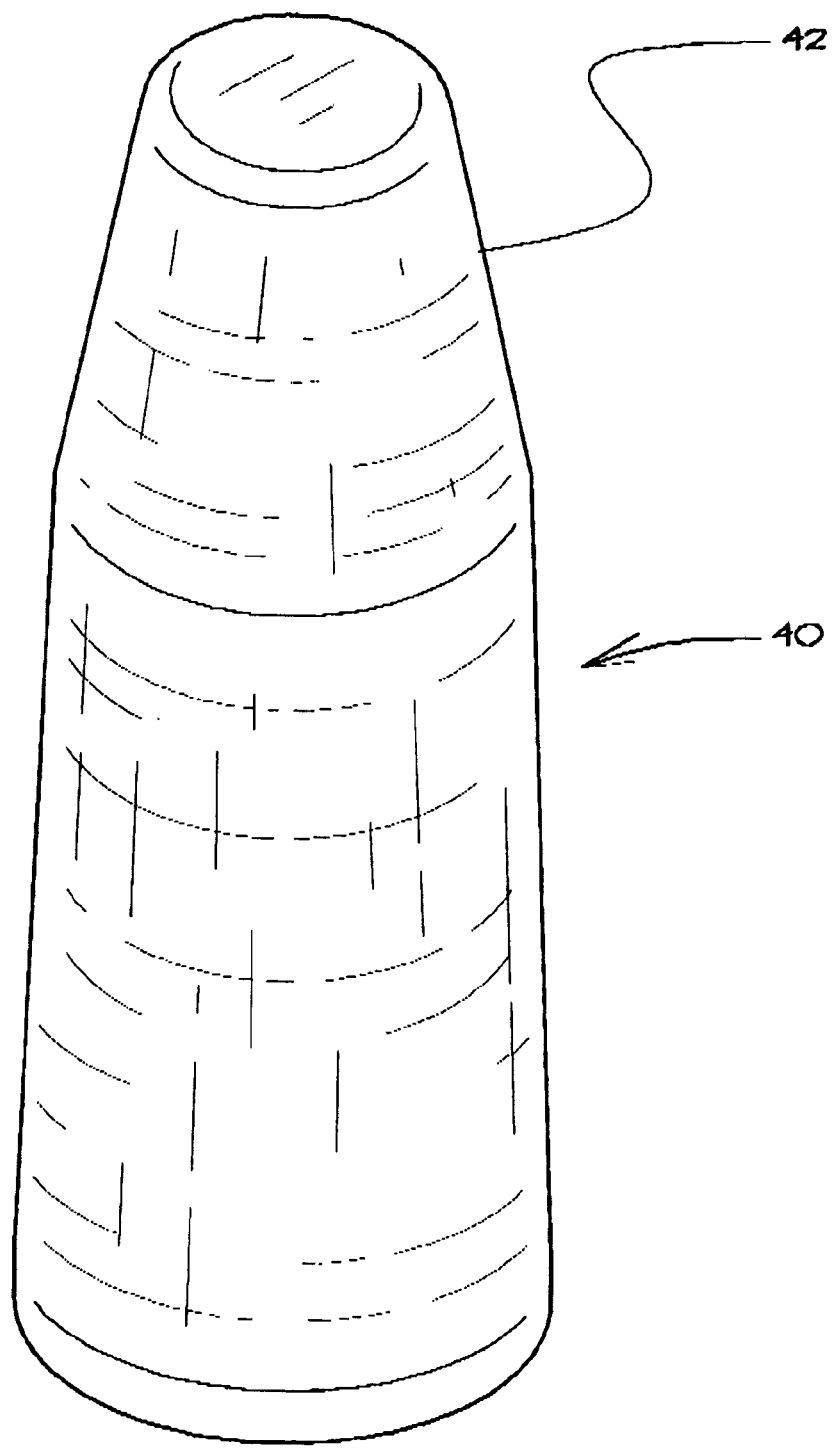
FIG. 4 is a view showing a common leg for fitting into the bottom of the platform module.
Figure 4A:
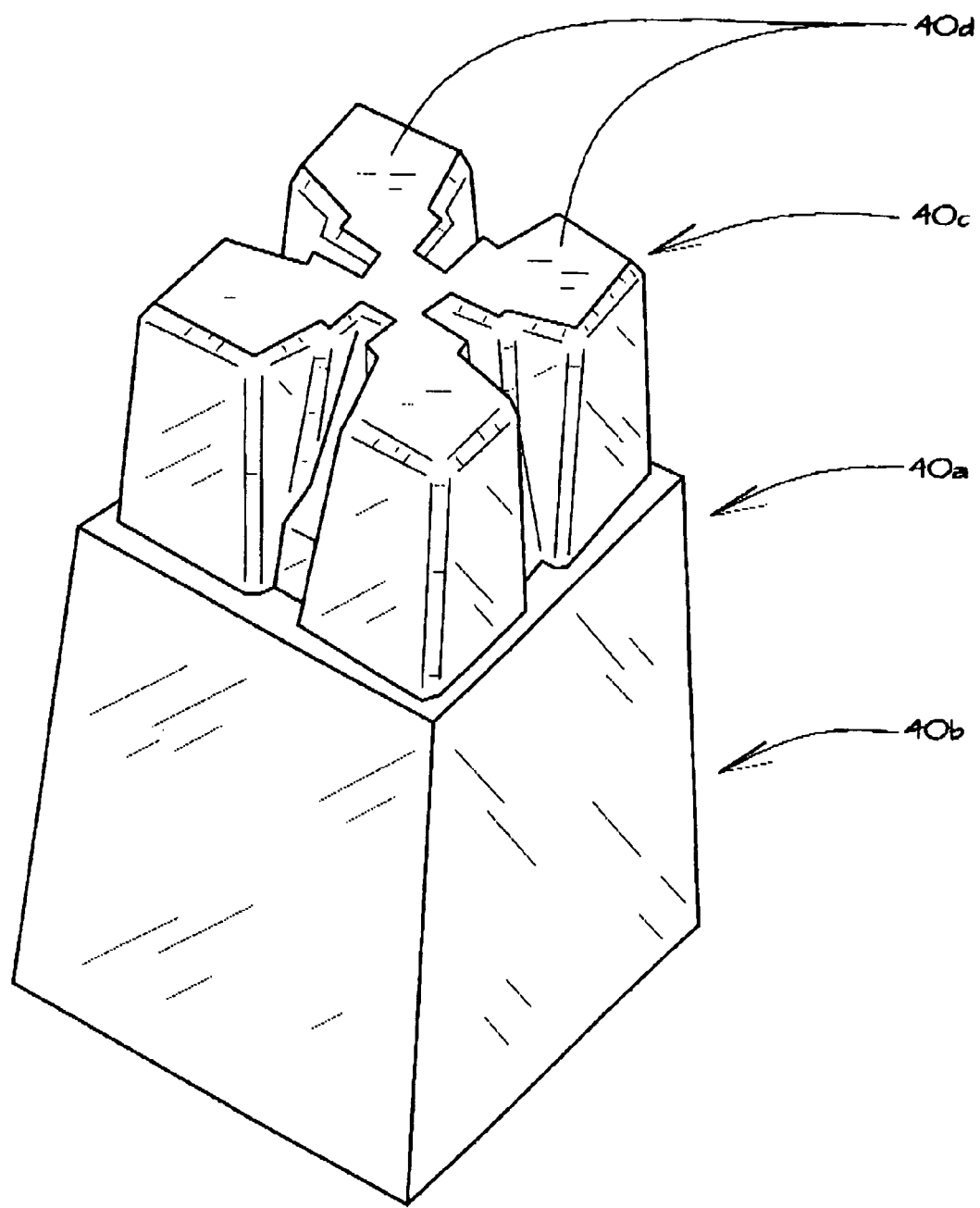
FIG. 4A is a view showing an optional, very high load capacity leg to be used in lieu of the leg of FIG. 4.

The four corners 41 of the bed platform module 12 are modified from those shown in the '102 patent, recessed and making room for a bolt to be installed to secure the gang of four corners down to the corner pedestal or leg. The bed platform modules 12 are successively assembled together, onto the legs 40 or 40*a* (of which there may be five for each module, occupying all positions 38 in FIG. 3 except at corners), and onto the special corner pedestals or legs 34. As shown in FIG. 5 and in the bottom view of FIG. 6, the corner legs 34 each have four upstanding members generally comprising quarter-leg prongs 43, each of which enters a bottom leg cavity of one of the four platform modules at the corner intersection. It can be seen from FIGS. 3, 3A and 5 that these upwardly extending quarter-leg members, which are tapered, will engage into the corner leg sockets 38c and will engage against the outer rounded surface 38d of this socket. This is also seen in dashed lines in FIG. 8, which is a plan view showing the corners of four bed platform modules 12, and showing the quarter-leg members 43 in dashed lines, engaging against the rounded, tapered facets 38d of the undersurface structure of the bed platform module 12.

Figure 7:
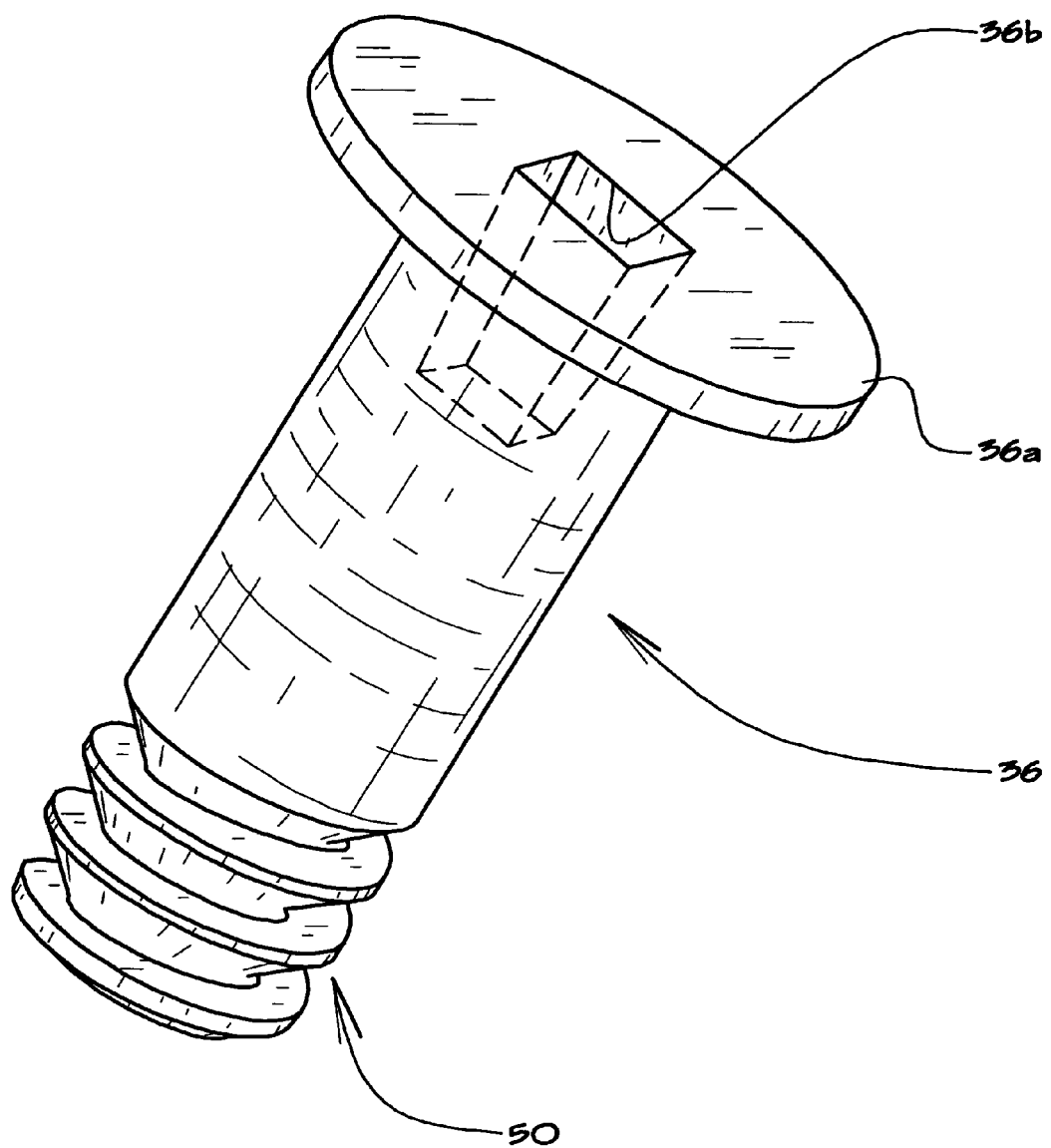
FIG. 7 is a perspective view showing a bolt used to secure together, and to the corner leg, the four platform module corners at intersections.
Figure 8:
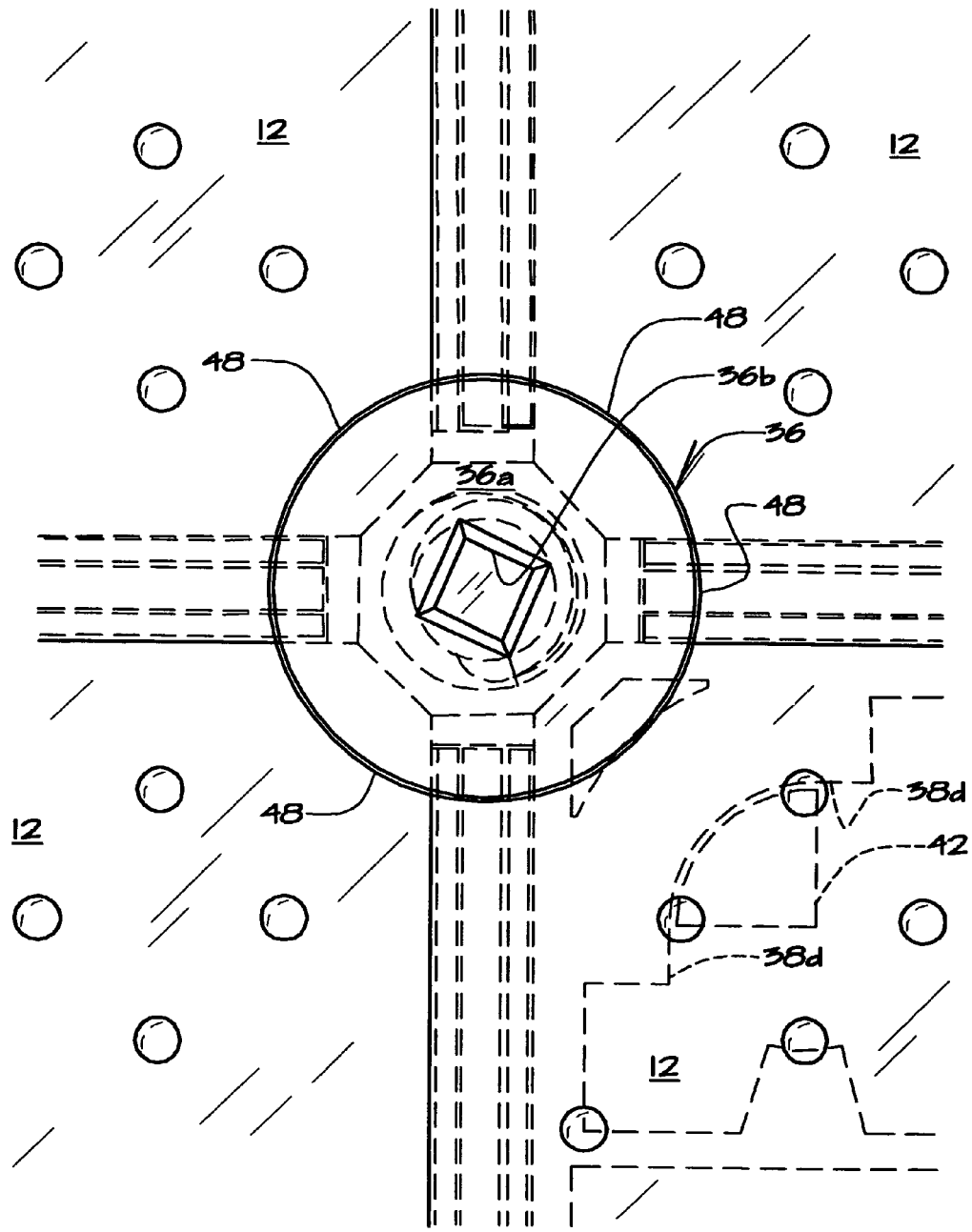
FIG. 8 is a top plan view showing the corners of four assembled platform modules with the screw holding the modules in place.

FIG. 8 also shows the bolt 36, specifically the head 36a of the bolt, retaining the four platform module corners in place and in secure connection to the corner pedestal or leg 34 below. The head 36a can have any appropriate form of drive engagement, but a drive socket 36b which is easily cleaned is preferred. FIGS. 7 and 8 illustrate a tapered square drive socket 36b which can easily be cleaned out when an assembly of modules is to be dismantled after use in supporting biofiltration medium or compost medium.

The head 36a of the bolt may be about four inches in diameter, or at least about three inches in diameter, to allow for secure and reliable engagement against an engagement surface 46 at each of the four corners of the bed platform module 12 as shown in FIG. 2. These surfaces 46 are generally arcuate, i.e. quarter-circular in shape, set downward from the top surface of the module by approximately the thickness of the bolt head, which may be about ¼ to ⅜ inches. As shown in FIG. 2, at each corner is an arcuate edge 48 where the top surface 26 is interrupted for this recess or ledge, and this arcuate edge 48 is seen in FIG. 8 for each of the four modules.

The bolt 36 may be of a high strength plastic material, and may have a diameter of about 2 inches and a relatively coarse thread 50, which may be about two threads per inch. This thread engages with a female-threaded hole 52 seen in FIGS. 5 and 6, in the corner leg or pedestal 34. The corner-retaining upstanding quarter-leg members 43 of the corner pedestal 34 are configured to engage tightly against the walls of the leg sockets in the four platform modules. The drawing down of the modules with the bolt 36 engaging in the threaded hole 52 of the pedestal forces the four modules closer together at the corners, as the tapered quarter-leg members 43 engage more deeply in the sockets. This makes a very secure and rugged corner connection wherein all platform modules are tightly retained together and to the corner pedestal 34 below.

The components of the biofiltration support system of the invention can advantageously be compression molded of low density polyethylene. The compression molded components are very strong as compared to rotocast components, and in a preferred embodiment the components are essentially hollow, including the legs 40 and 40a and the corner leg or pedestal 34. The shapes of the legs and corner legs can vary. The corner leg or pedestal 34, shown outwardly/downwardly tapering in FIG. 5, can be straight-sided or can taper in the opposite direction, so that the base 34b which contacts the supporting surface can be a smaller square than at the top of this component.

Figure 9:
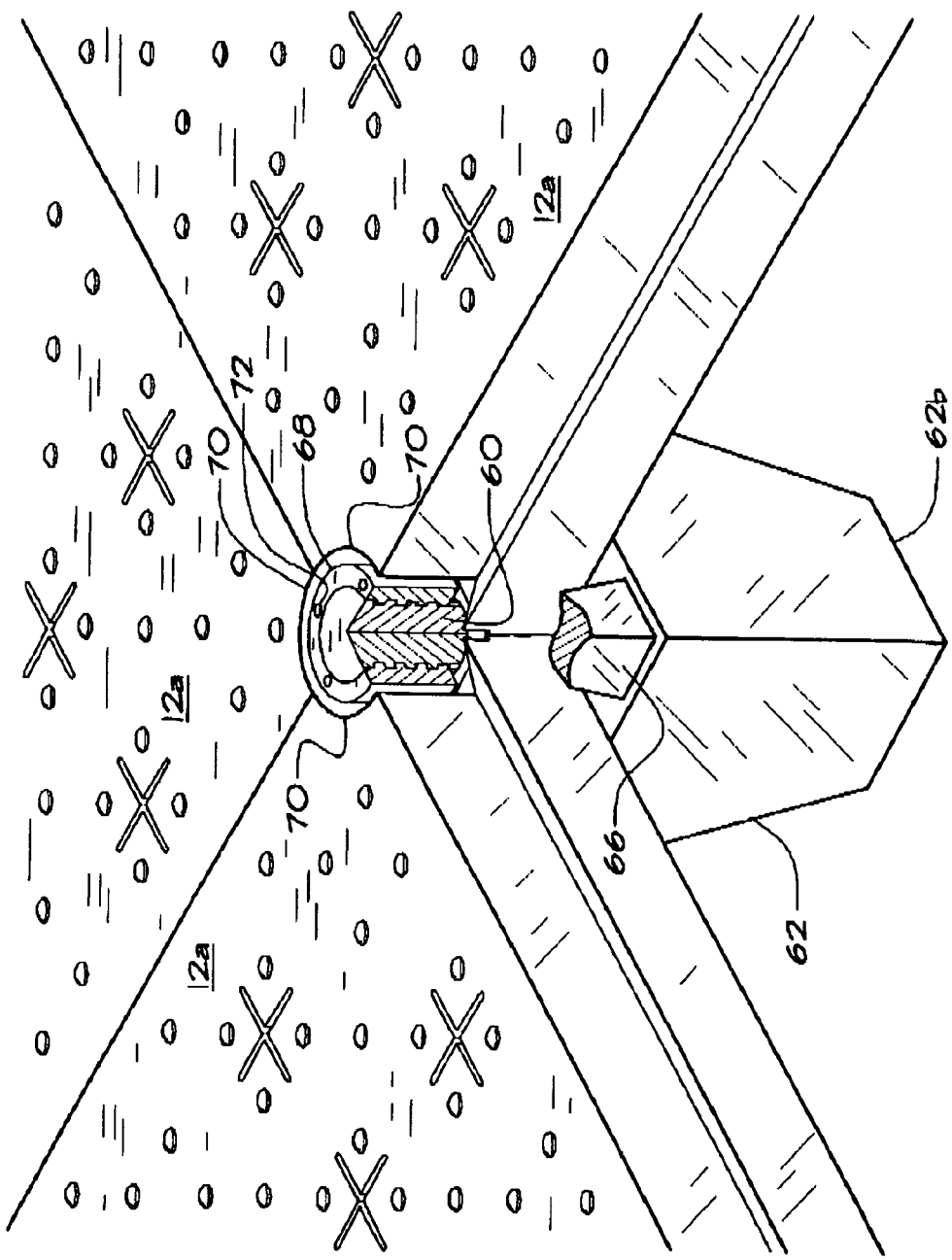
FIG. 9 is a perspective view, partially broken away, showing an alternative form of corner connection for the platform modules and showing the inter-fitting of adjacent platform modules.
Figure 10:
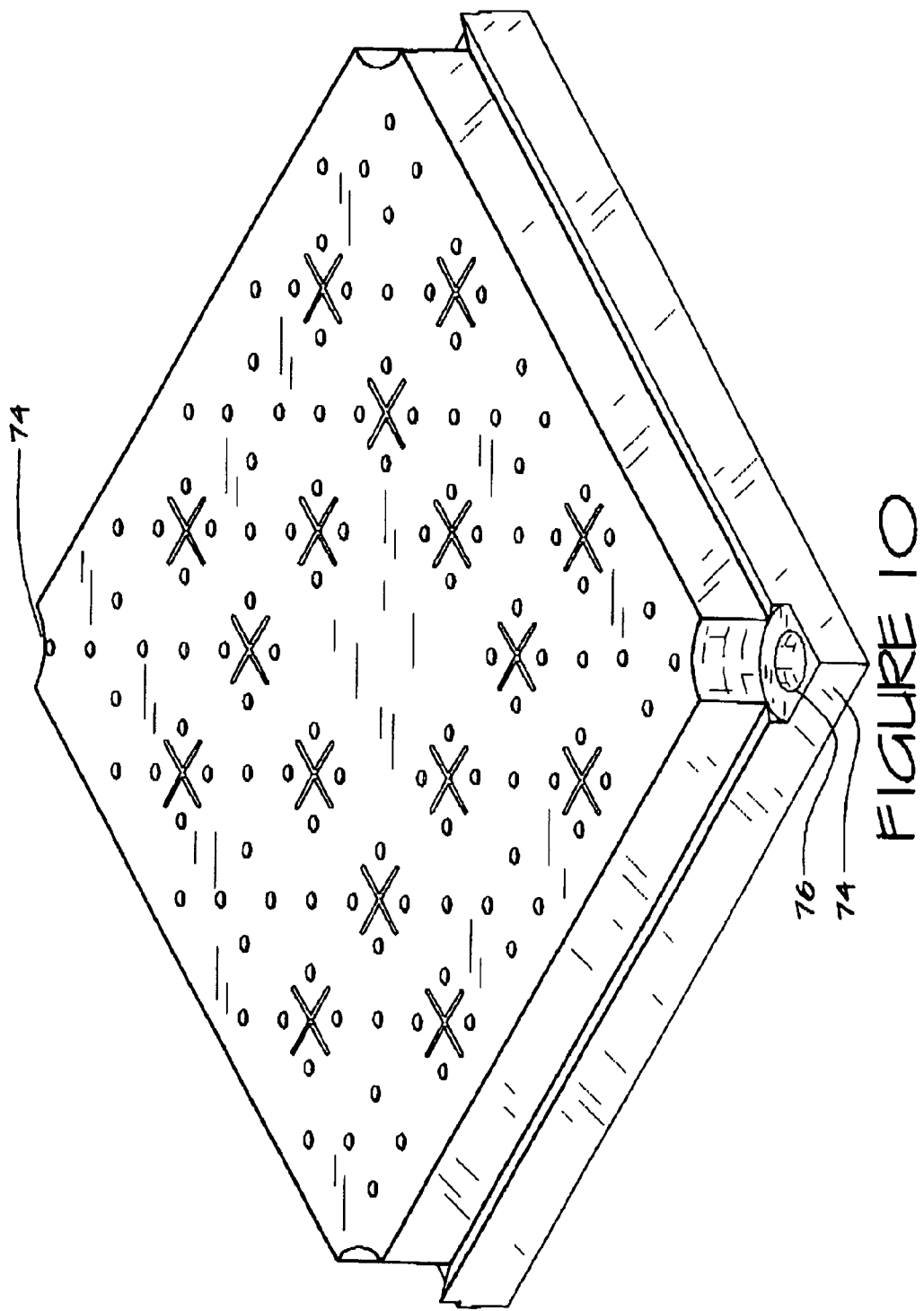
FIG. 10 is a perspective view showing one of the platform modules of FIG. 9.
Figure 11:
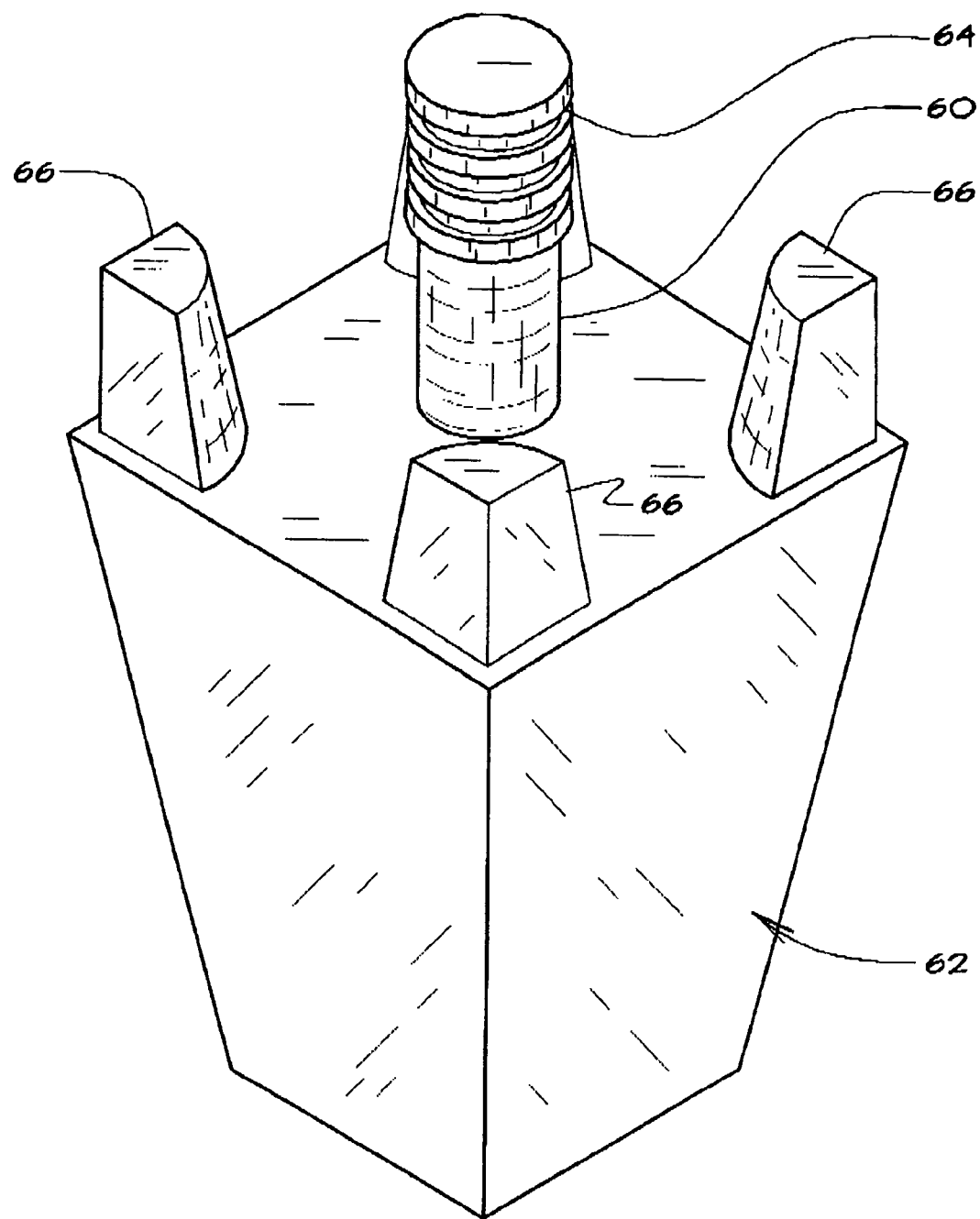
FIG. 11 is a perspective view showing a modified corner stand or leg for the embodiment of FIGS. 9-10.
Figure 12:
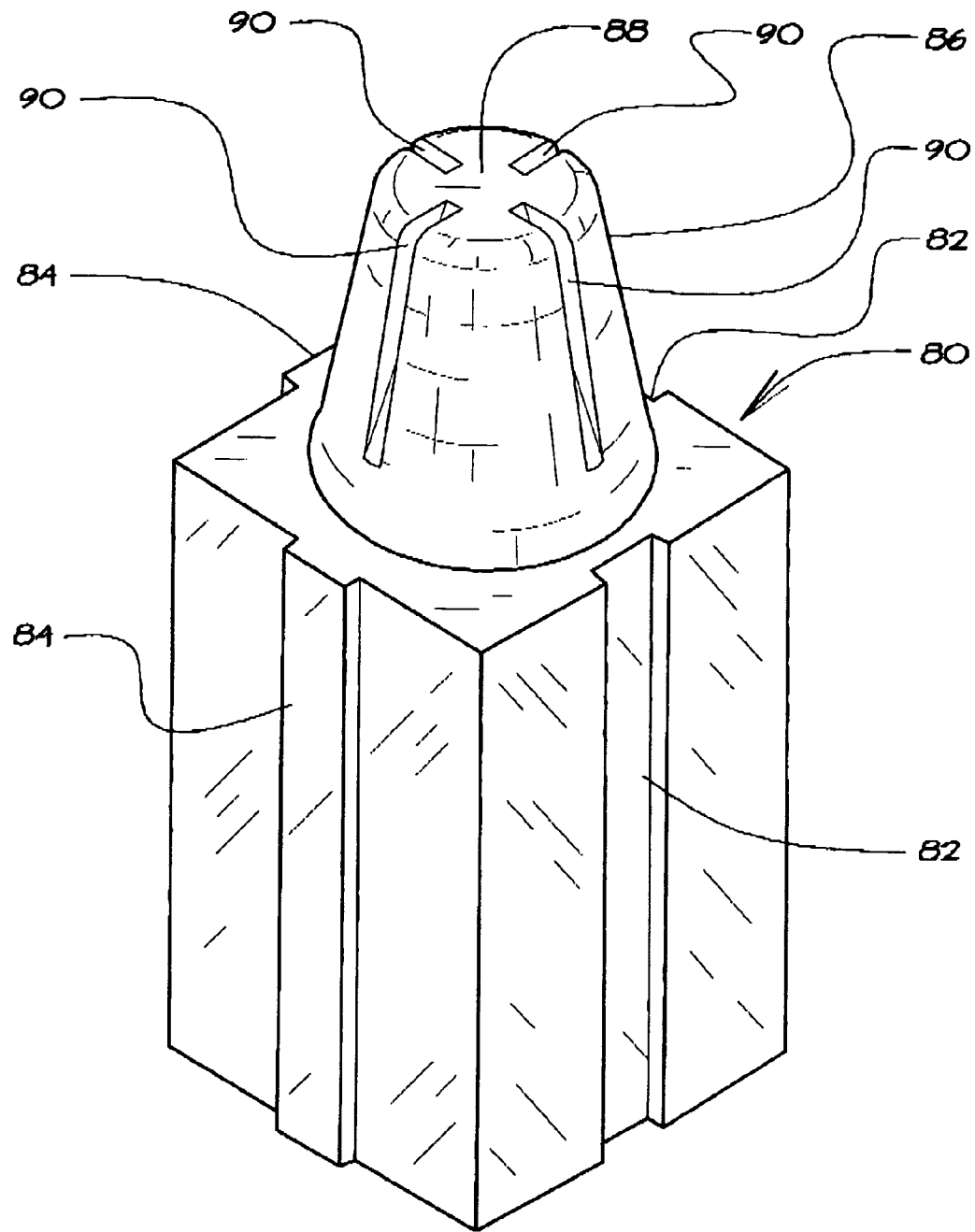
FIGS. 12 and 13 are perspective views from upper and lower positions, showing a curtain like module which fits into sockets in the bottom of the bed platform modules.

FIGS. 9-11 show an alternative embodiment, modified from the first embodiment in that a stud 60 extends up from a modified corner leg or pedestal 62 as shown in FIG. 9. The corner leg 62 may be tapered to be smaller at its base 62b, as discussed above. FIG. 11 shows the corner leg with the stud 60 extending upwardly and having male threads 64. In other respects the corner leg or pedestal 60 is similar to that of the first embodiment, with four upstanding quarter-leg members 66 for engaging in leg sockets where corners of four platform modules meet, as described above. The stud 60 is integrally molded with the remainder of the pedestal 62. When the four corners are assembled onto the corner leg or pedestal 62, the stud 60 extends up through the module intersection as shown in FIG. 9, and is engaged by a cylindrical nut 68. The structure of the corners of the modules 12a is somewhat difference from what is described above in that the arcuate corner recesses are much deeper to accommodate the depth of the nut 68. The nut can be installed and removed by a suitable tool such as one that engages in holes 72 in the top of the nut.

Another difference is shown in FIG. 10, indicating that opposite corners 74 are formed with a hole or partial hole 76 for fitting over the stud 60. This is seen in FIGS. 9 and 10.

As shown in FIG. 1, the bed platform is advantageously constructed against a wall 16, on two or three sides. Open sides can be closed in several ways: in the manner shown in U.S. Pat. No. 6,255,102; or with flanges or add-on baffles (not shown) extending between corner legs and common legs at the edge of the structure (see FIG. 3A for leg positions); or with curtain legs such as the modular curtain legs shown in FIGS. 12-15.

FIGS. 12-15 show modules 80 that can be assembled together side by side. The modules have vertical slots 82 in adjacent sides and vertical ridges 84, that fit in grooves 82, in the other two adjacent sides as shown in FIG. 1. The top of the module 80 has an upward protrusion 86 that is shaped to be received in the bottom leg-receiving recesses 38 and 38c as shown, for example, in FIG. 3. Thus, in this embodiment they are generally shaped as truncated cones, with a flat top 88 that engages against the bottom surface 38a in the leg sockets. In addition, however, the modules will fit into spaces or sockets 38f shown in FIG. 3, these spaces not being designed to receive the normal legs. To this purpose, the upper protrusion 86 of the curtain leg module 80 has four slots 90 in order to receive the particular structural pattern shown in FIG. 3.

Figure 13:
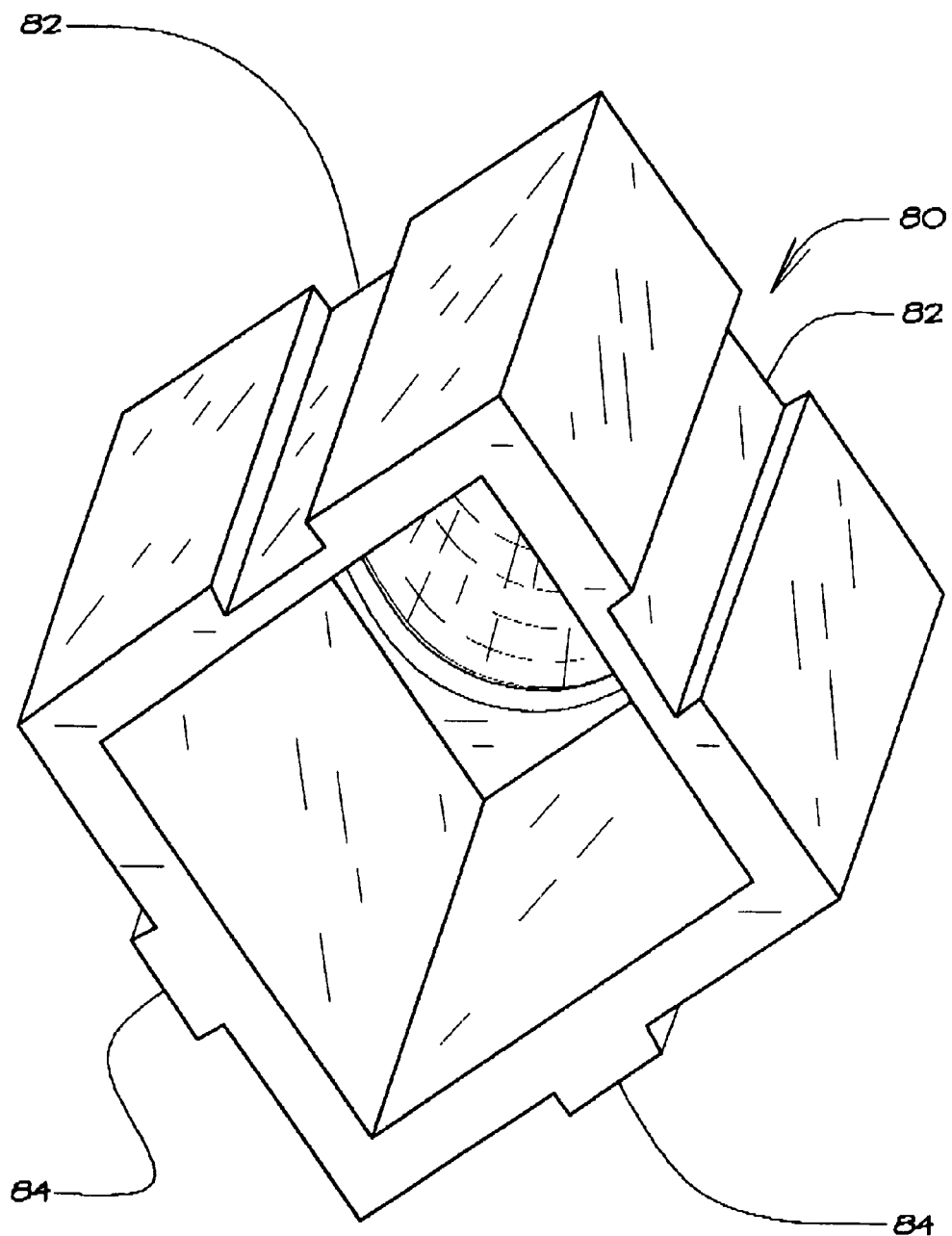
Figure 14:
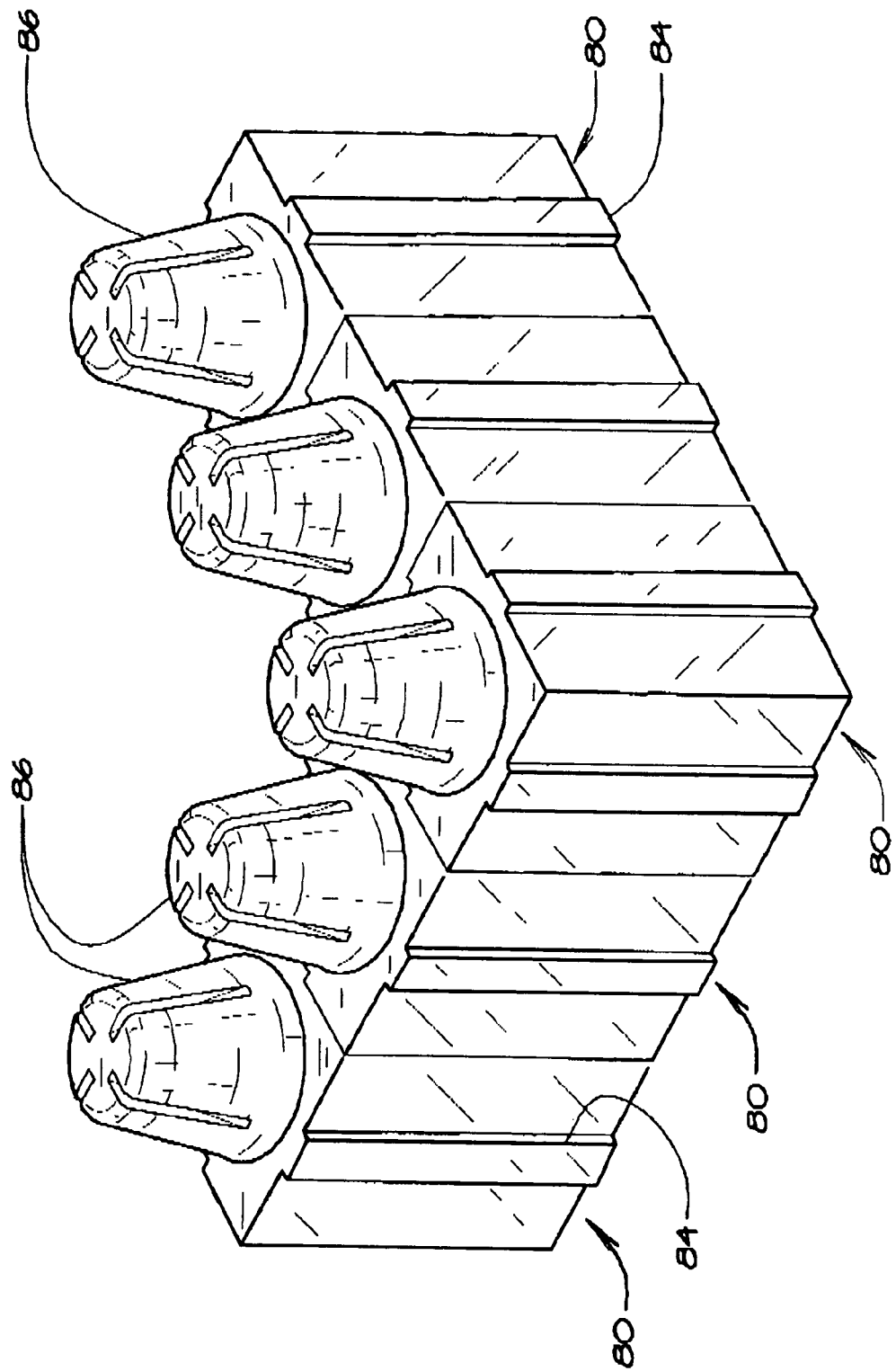
FIGS. 14 and 15 are further perspective views, showing a series of the curtain leg modules assembled together side by side.
Figure 15:
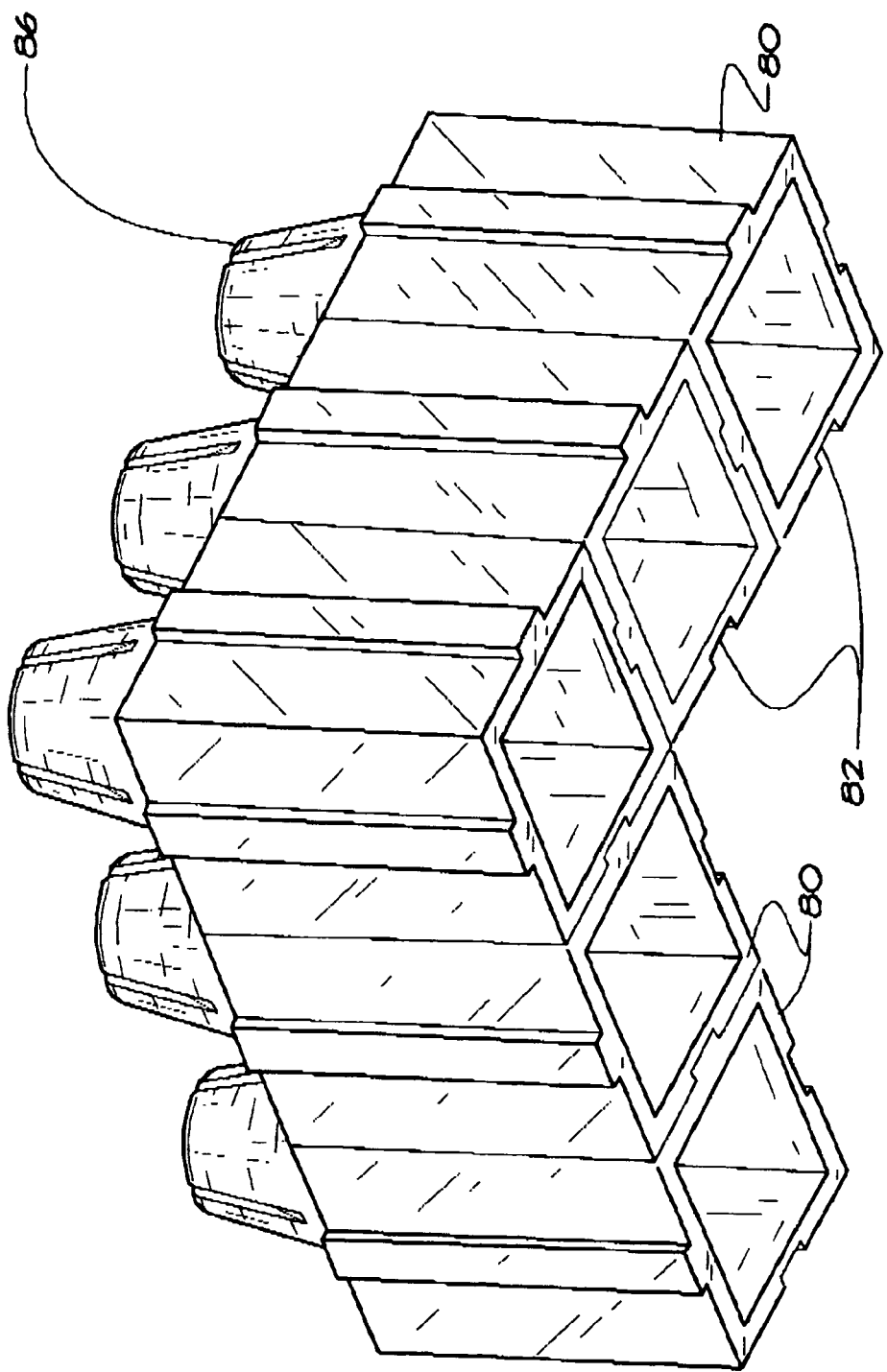

The side by side curtain leg modules 80 are shown in FIGS. 14 and 15, while FIG. 13 shows the bottom side of the module, revealing the hollow interior. The modules 80 can be assembled along a single line, to close a single edge of the module support assembly, or they can be assembled on two sides, forming a corner as in FIGS. 14 and 15. By structuring the modules so as to enter every cavity or recess along the edges of the support modules, some of the modules substantially close the air plenum beneath the assembled support bed.

Because the modules 80 fit into all cavities in the bottom surface of the bed modules (FIG. 3) they can also be used to direct an air flow in the plenum beneath the support bed. For example, where air or gas enters under pressure (see FIG. 1), if the shape of the assembled support bed is long and narrow or otherwise of a configuration so as to make it difficult to evenly distribute the gas, channels can be formed in appropriate locations using the curtain like modules 80 assembled together within the plenum. They can be placed between the interior corner legs or pedestals, or they can be configured to connect to the interior corner legs.

In a preferred embodiment all components, or at least most of the components, of the modular bed platform assembly of the invention are made of recycled plastic materials. Recycled materials from industrial uses are preferred, and these comprise mostly polyethylene and polypropylene.

The system of the invention can support at least about 17,500 pounds per platform module, assuming the modules are about two feet square. As explained above the system is advantageously used as a compost bed support for aerated composting, and it is also useful for other purposes where a porous load supporting floor is needed, particularly one which is non-corrosive and non-reactive, such as for supporting cattle or pigs, as in a slaughterhouse.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A modular support system, comprising:
   (a) a multiplicity of polygonal bed platform modules having generally planar top surfaces and shaped to be arranged side-by-side contiguously to form a raised bed platform covering a selected area,
   (b) a multiplicity of bed support legs having upper ends engaged with bottom sides of the bed platform modules, and of length sufficient to support and elevate the bed platform modules above a base surface on which the support system rests,
   (c) corner pedestals in positions where a plurality of corners of the polygonal bed platform modules come together in the assembly, each corner pedestal having a plurality of portions positioned to engage with a bottom side of one of the bed platform modules, so that the corner pedestal supports all adjacent bed platform modules at said corners and retains the bed platform modules together at said corners, and
   (d) a large threaded fastener positioned centrally of each corner pedestal, securing the corners of the adjacent bed platform modules down against the corner pedestal by acting downwardly against the adjacent bed platform modules such that the bed platform modules adjacent to each corner pedestal are drawn more closely laterally together on assembly as the fastener pulls the platform modules down against the corner pedestal,
   whereby the bed platform modules are securely held together and to the corner pedestal at corners of the platform modules, and whereby the assembled modular support system can support a relatively heavy load in a secure and stable manner.

2. The modular support system of claim 1, wherein the bottom sides of the bed platform modules have leg sockets that are tapered, and wherein the plurality of portions of the corner pedestals comprise upstanding members on the corner pedestals complementarily tapered such that the bed platform modules over the corner pedestal are drawn laterally more tightly together as they are drawn downwardly by the threaded fastener toward the corner pedestal.

3. The modular support system of claim 1, wherein the bed platform modules are compression molded of low-density polyethylene.

4. The modular support system of claim 1, wherein each bed platform module is rectangular and has two adjacent edges having an overhanging upper lip and two opposite contiguous edges each having an outwardly extending lower lip, each upper lip being configured to engage over a lower lip of an adjacent module so as to nest the adjacent modules closely together.

5. The modular support system of claim 4, where the upper and lower lips are sloped such that as adjacent modules are brought toward a common level they are drawn more closely together.

6. The modular support system of claim 1, wherein the threaded fastener comprises a bolt with an enlarged head, and wherein the corner pedestal has a threaded hole, such that as the bolt is screwed down into the hole in the corner pedestal, the head of the bolt draws four adjacent module corners downwardly toward the corner pedestal.

7. The modular support system of claim 6, wherein the bolt is formed of compression molded plastic.

8. The modular support system of claim 1, wherein the bed platform modules, bed support legs and corner pedestals are all formed of recycled plastic material.

9. The modular support system of claim 1, capable of supporting a load of at least about 45,000 pounds per square foot.

10. The modular support system of claim 1, wherein the fastener comprises a nut, and wherein the corner pedestal includes a threaded stud extending upwardly at a corner intersection of a plurality of platform modules, the nut being screwed down onto the stud and engaging all of the adjacent platform module corners to hold them down against the corner pedestal.

11. The modular support system of claim 1, further including curtain leg modules at an edge of the assembled bed platform, the curtain leg modules having upper ends that fit in leg sockets in the bottom sides of the bed platform modules and being configured to nest together so as to substantially seal a plenum below the assembled bed platform.

12. The modular support system of claim 1, wherein at least some of the bed platform modules are perforated so as to allow gas or liquid to pass through the bed platform.

13. The modular support system of claim 12, further including a bed of material supported on the bed platform, the material being one through which air, gas or liquid is to be passed vertically.

* * * * *